Oct. 9, 1934.  E. S. HUFF  1,975,847
TUNING DEVICE FOR AUTOMOBILE RADIORECEIVERS
Filed Aug. 15, 1932  2 Sheets-Sheet 1

INVENTOR.
E. S. Huff
BY
ATTORNEY.

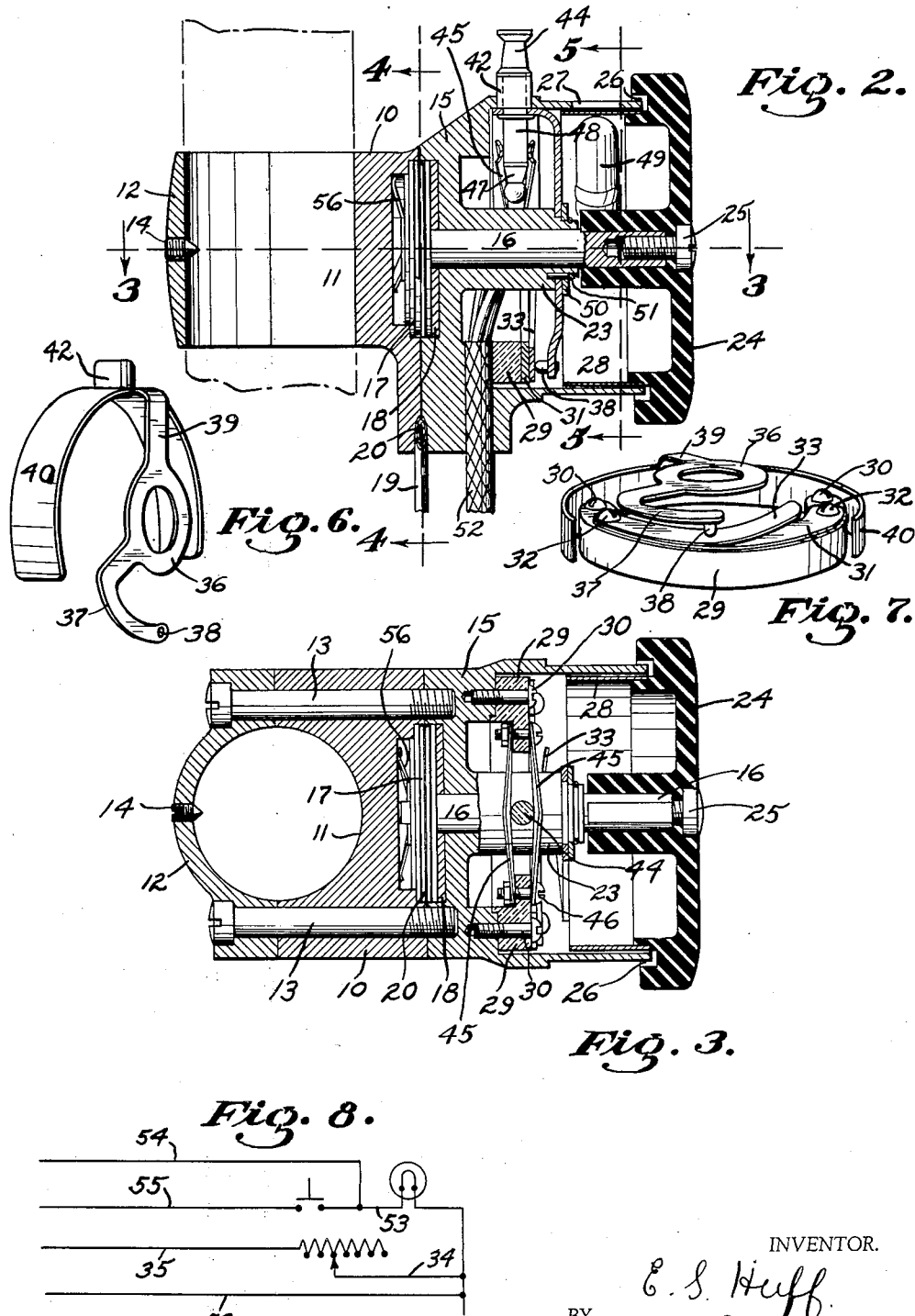

Patented Oct. 9, 1934

1,975,847

UNITED STATES PATENT OFFICE 1,975,847

TUNING DEVICE FOR AUTOMOBILE RADIORECEIVERS

Edward S. Huff, Dearborn, Mich., assignors to Ford Motor Company, Dearborn, Mich., a corporation of Delaware Application August 15, 1932, Serial No. 628,882

9 Claims. (Cl. 250—20)

The object of my invention is to provide a tuning device for automobile radios which will be simple to construct, inexpensive to manufacture and very durable in operation.

More specifically, the object of my invention is to provide a control unit which may be clamped to the steering column of a vehicle and the operation of which will control a radio set located in the rear of the car. It is very desirable to locate the radio receiver proper at the rear of the car so as to minimize the static caused by the high frequency oscillation of the current in the ignition system of the engine. With my device the radio set is located in a metal box beneath the floor boards at the rear of the car and the set is connected with my improved tuning device by a plurality of electrical cables and what is better known as a Bowden wire operating cable. This Bowden wire is actuated by a tuning knob in the device and rotates a condenser unit in the radio set.

There are several requisites for the successful operation of a vehicle radio, among which are: First, the knob which the operator turns to tune in the set must be connected with the condensers so that no backlash is allowed. The presence of backlash in any such controlling device makes its operation very difficult. Further, it is desirable that the dial of the control unit be illuminated so that the unit may be conveniently operated at night. Still further, a volume control should be provided, an on and off switch is required, and some means for locking the set should be included. In my improved device I have combined all of these requisites in a compact control unit. No backlash whatever is allowed between the tuning knob and the condenser of the radio. Further, I have provided a key located so that when it is inserted in position it acts as a switch to start the radio, and when this same key is moved arcuately around this device then it controls the volume of the set. Further, the dial is illuminated in the usual manner. Thus, only two operable controls are provided which perform all the necessary functions to operate the radio set.

With these and other objects in view of my invention consists in the arrangement, construction and combination of the various parts of my improved device, as described in the specification, claimed in my claims, and illustrated in the accompanying drawings, in which:

Figure 2 shows a sectional view through the control unit taken on the line 2—2 of Figure 1.

Figure 3 shows a sectional view, taken on the line 3—3 of Figure 2.

Figure 6 is a perspective view, illustrating my combined rheostat operating arm, dust shield and key socket.

Figure 7 shows a perspective view of the rheostat, illustrating its method of operation, and Figure 8 is a wiring diagram of the several parts of this device.

Figure 1:
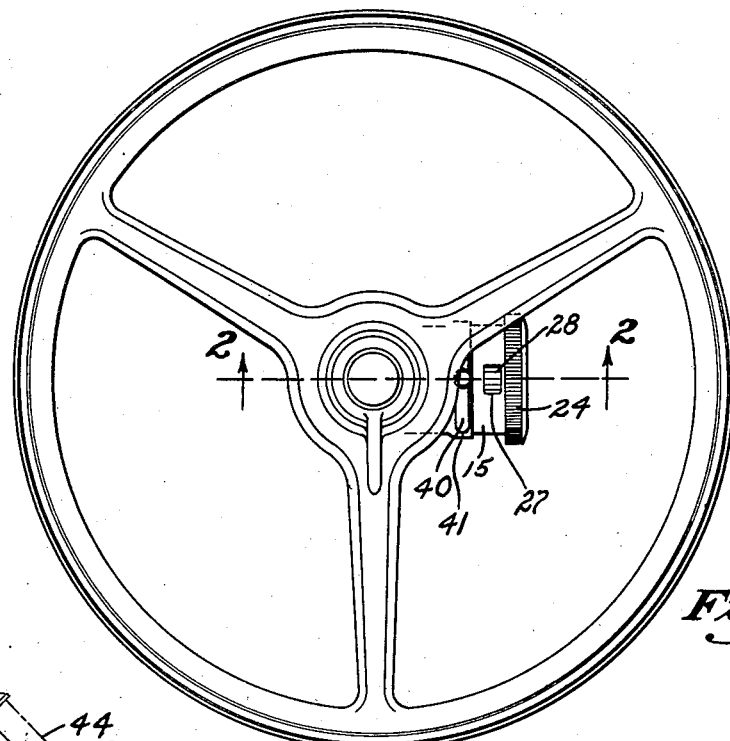
Figure 1 shows a plan view of my improved control in position mounted on the steering column of a motor vehicle. It will be noted that its position is just beneath the steering wheel of the car.

Referring to the accompanying drawings, I have provided a base portion 10 which has a cylindrical recess 11 formed therein over which a cap 12 is secured by means of a pair of bolts 13. The cap and base are adapted to clamp around the steering column of an automobile just beneath the steering wheel. A set screw 14 is provided in the cap 12 which is pointed so that a good ground connection will be made with the steering column. It is sometimes desirable to place a thin piece of rubber between the clamp and the column so that minute vibrations of the vehicle will not be transmitted to the tuning device. In this case the screw 14 simply punctures the rubber and makes an electrical contact with the metal of the tube.

A cup-shaped cylindrical housing 15 is secured to the base 10 by means of the bolts 13 so as to be secured to the steering column with the open end of the housing projecting radially from the tube. A shaft 16 extends axially through the housing 15 which shaft is formed integrally with a sheave 17 disposed on its inner end, the coacting surfaces of the housing 15 and base 10 being recessed to accommodate the sheave 17. A fiber or felt friction pad 18 is interposed between the sheave 17 and the housing 15 and a resilient spring washer 56 is placed between the base 10 and the adjacent side of the sheave 17. Thus, when the shaft and sheave are assembled in place the resilient washer urges the sheave against the friction pad 18 thereby setting up considerable resistance to the rotary movement of this sheave.

Figure 4:
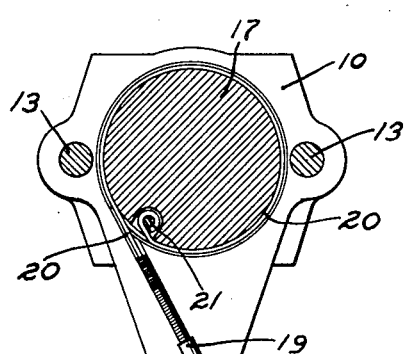
Figure 4 shows a sectional view, taken on the line 4—4 of Figure 2.

It will be noted from Figure 4 that a flexible tubular conduit 19 is clamped between the base 10 and the housing 15 which conduit extends tangentially to the sheave 17. A flexible wire 20 extends through the conduit 19 and is wrapped several turns around the sheave 17, its end being secured in the suitable recess in the sheave by means of a screw 21. Thus, rotation of the sheave 17 in a clockwise direction, as shown in Figure 4, will draw the wire 20 in the direction of arrow 22. The conduit 19 and wire 20 extends down along the steering column of the vehicle, through the front dash of the vehicle, and along the frame to the radio receiving set compartment in the rear of the car. The adjacent end of the wire 20 is wrapped around another sheave, not shown in the drawings, which sheave is secured directly to the condenser shaft of the receiving set. This shaft is connected to a spring so that the condenser shaft is resiliently urged to rotate against the clockwise movement of the sheave 17. However, the friction pad 18 sets up sufficient resistance so that the condenser shaft spring will not rotate the sheave 17 against this friction. Upon counterclockwise movement of the sheave 17 caused by the manual rotation of the shaft 16, the spring on the radio set tensions the wire 20 so as to take up all the slack between the two sheaves. Thus, movement of the shaft 16 in a clockwise direction will positively rotate the condenser shaft of the radio set and inversely, when the shaft 16 is rotated through even a very small movement in the counterclockwise direction, then the tension spring of the radio set rotates the condenser shaft through an exactly equivalent degree. I am enabled to eliminate the backlash between the shaft 16 and the condenser shaft by the provision of the return spring on the condenser shaft working against the friction produced by the pad 18.

Figure 5:
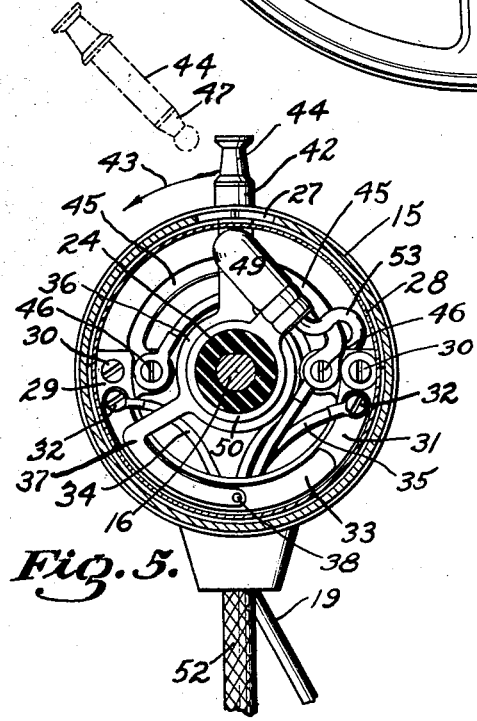
Figure 5 shows a sectional view, taken on the line 5—5 of Figure 2.

It will be noted from Figure 2 that the housing 15 is of cup-shaped form and is provided with an axial boss 23, this boss rotatably receiving the shaft 16. This shaft projects out beyond the rim of the cup member and a disc-like knob 24 having corrugations around its periphery is secured to the outer end of the shaft 16 by means of a set screw 25. The knob 24 projects radially beyond the rim of the housing 15 and is provided with an annular groove 26 therein in which the rim of the housing projects to form a fairly tight closure over the open end of the housing. Figures 3 and 5 show that the outer end of the shaft 16 is flatted which flat coacts with a correspondingly shaped opening in the hub of the knob 24 thereby non-rotatably mounting the knob on the shaft independently of the locking screw 25.

It will be noted from Figure 2 that the housing 15 is provided with a rectangular-shaped aperture 27 in the upper portion of its rim and that a cylindrical transparent dial 28, formed from celluloid or similar material, is secured to the inside face of the knob 24, this dial being slightly smaller than the inside diameter of the housing. The dial 28 is calibrated to read in either wave length or frequency, as is customary with radio tuning dials. Only that portion of the dial 28 beneath the aperture 27 is visible to the operator in tuning the device.

It will be noted from Figures 3 and 5 that I have provided a sector-shaped member 29 of insulating material which member is fastened to the base of the housing 15 by means of a pair of screws 30. A sector-shaped carbon impregnated resistance strip 31 is secured on the upper face of the insulation 29 by means of a second pair of screws 32, and a sector-shaped copper strip 33 of lesser length is secured over the strip 31, this copper strip being fastened by only one of the screws 32. Figure 7 illustrates that the strip 33 is bowed so that normally it pulls away from the resistance strip 31, however, with a pressure at any point there along the copper strip may be made to contact with the resistance. This copper strip 33 is grounded by means of a lead wire 34, and a wire 35 is connected to the end of the resistance opposite the grounded end of the copper strip. Thus, by pressing the grounded copper strip against the resistance element at progressively increasing distances from the lead 34, an increased portion of the resistance will be cut out thereby lessening the effective resistance.

I have provided a novel device for varying the point at which the strip 33 bears against the resistance 31. The boss 23 is provided with a shoulder near its outer end upon which a spring bronze collar 36 is rotatably mounted. A resilient arm 37 is formed integrally with the collar 36 and the outer end of this arm is provided with a fiber detent 38 which is adapted to successively bear against the strip 33 over substantially its full length as the collar 36 is rotated upon the boss 23. A second arm 39 extends up radially from the collar 36 diametrically opposite to the detent 38, the outer end of this arm being formed integrally with a resilient arcuate shaped dust shield 40. The member 40 is somewhat over two hundred degrees in length and in its free position is of a diameter somewhat larger than the interior of the housing 15 so that when the device is installed in position, the member 40 frictionally resists rotation of the collar 36.

It will be noted from Figure 1 that the housing 15 is provided with a segmental slot 41 opposite to the insulating member 29. A sleeve 42 is fixedly secured in the center portion of the dust shield 40, which sleeve extends out through the slot 41. As the slot 41 is just slightly over ninety degrees in length and the dust shield 40 is somewhat over two hundred degrees, it will be seen that movement of the sleeve 42 through the entire length of the slot will not prevent the dust shield 40 from forming a dust tight enclosure for the remainder of the slot. By moving the sleeve 42 in the direction shown by the arrow 43 in Figure 5, the effective length of the resistance strip 31 will be progressively shortened thereby decreasing resistance. This resistance is connected to control the volume of the radio set.

I have provided a plug key 44 which is adapted to be inserted into the sleeve 42. This key also actuates an electric switch which turns on and off the radio set. It will be noted from the drawings that a pair of resilient arcuate switch plates 45 are secured side by side to the ends of the insulating member 29, these plates extending oppositely from the resistance 31 and being secured to opposite sides of the block of insulation 29. These plates although being secured in place by a single pair of screws 46 are nevertheless insulated from each other by suitable fiber washers, not shown in drawings. The inner end of the key 44 comprises a metallic ball and sleeve 47, while a fiber sleeve 48 is located above the sleeve 47 so that when the key is inserted the full distance into the sleeve 42 the fiber sleeve 48 will separate the two plates 45, these plates 45 being resilient will allow the key to be moved arcuately through its full range, as is required for operating the rheostat. However, when the key 44 is pulled outwardly so that the metallic sleeve 47 separates the plates 45 then an electrical contact is made between the two plates which is arranged to start the set. The contact is completed over the full range of the rheostat. Of course, when the key 44 is entirely removed then the set cannot be operated unless a similar key is provided.

In order to illuminate the dial 28, a small light bulb 49 is provided, this bulb being secured in a suitable socket which is fixedly secured to a collar 50. The collar 50 is non-rotatably mounted on the outer end of the boss 23. A snap ring 51 is secured over the collars 50 and 36 to retain these two collars in position.

Referring to the wiring diagram, shown in Figure 8, it will be noted that four electrical leads extend from the control unit to the radio set. One of these leads constitutes a ground, which I have marked 52, and consists of a braided metallic shield which surrounds all of the other leads. This shield is connected to the ground lead 34 which, in turn, is connected to the housing 15 by means of the screw 32. One terminal of the lamp bulb 49 is grounded to the collar 50 while the other terminal is connected to one of the switch plates 45 by a wire 53 which plate is also connected to a wire 54 which extends out through the shield 52. A wire 55 also extends out through the shield, it being connected to the other switch plate, while the wire 35 from the resistance also extends out through this shield. The wires 54 and 55 complete the circuit for operating the radio set, while the wire 35 forms the volume control therefor.

To operate the device the operator simply inserts the key 44 into the sleeve 42. He then turns the knob 24 to tune in the desired station and then swings the key 44 to increase or decrease the volume as is desired.

Among the many advantages arising from the use of my improved device it may be well to mention that I have provided a very compact unit having a minimum number of parts therein, each of which is rigidly constructed and easy to manufacture.

Still further, the novel arrangement of my switch and rheostat eliminates one of the controls heretofore invariably provided with radio sets without detracting from the simplicity and ease of operating the device.

Still further, the friction break and spring return on the tuning unit eliminates the backlash between the tuning dial and the radio set so that very sensitive tuning of the radio receiver circuits is readily accomplished.

Some changes may be made in the arrangement, construction and combination of the various parts of my improved device without departing from the spirit of my invention and it is my intention to cover by my claims such changes as may reasonably be included within the scope thereof.

I claim as my invention:

1. A remote control head for an auto-radio receiving set comprising, a housing having an outwardly opening cup-shaped chamber formed therein, control mechanism for said radio disposed within said chamber, a shaft rotatably mounted in said housing in position to extend axially through said cup-shaped chamber, operative means extending between the inner end of said shaft and the radio set so that rotation of said shaft varies the wave length adjustment of the said radio set, and a relatively large operating knob fixed to the outer end of said shaft, said knob completing the enclosure of said cup-shaped chamber and mechanism therein.

2. A device, as claimed in claim 1, wherein a transparent cylindrical dial is fixed to the periphery of said knob in position extending into the open end of said housing, and wherein said housing is provided with an aperture therein through which said dial is visible, and wherein an incandescent lamp is located within said cup-shaped chamber in position to illuminate said dial and aperture.

3. A device, as claimed in claim 1, wherein said knob is provided with an annular groove therein in which the rim of said cup-shaped housing extends to thereby form a closure against the admittance of dust and dirt into the chamber within said housing.

4. A remote control head for an auto-radio receiving set comprising, a housing, a pair of substantially parallel switch blades disposed within said housing, a rheostat disposed within said housing, said rheostat having an operating arm which extends to position aligned with said switch blades and which arm is adapted to be rotated about the axis of the rheostat to actuate said rheostat, and a key associated with said device adapted to be inserted radially through an opening in said arm so as to form a lever for actuating same, said key upon insertion in place electrically connecting said switch blades together, for the purpose described.

5. A device, as claimed in claim 4, wherein said housing comprises, a cylindrical member which is provided with a segmental slot through which said key oscillates to control said rheostat, and wherein a dust shield is fixed to said arm which coacts with said segmental slot to form a closure therefor.

6. A remote control head for an auto-radio receiving set comprising, a housing adapted to be secured to the steering column of an automobile so as to extend radially therefrom, said housing having an outwardly opening cup-shaped chamber formed therein, a shaft rotatably mounted in said housing in axial alignment with said cup-shaped chamber, operative means connecting the inner end of said shaft with said radio set whereby rotation of the shaft will vary the wave length adjustment of said set, a relatively large knob fixedly secured to the outer end of said shaft the periphery of said knob coacting with the rim of said housing to form a closure therefor, a rheostat disposed within said chamber having an operating arm pivotally mounted in said housing in position concentric with said shaft, a switch disposed within said housing, said switch and rheostat being electrically connected with said radio to control the operation and volume output thereof respectively, and a key associated with said device adapted to be inserted radially through openings in said housing and rheostat arm so as to form a lever for actuating the rheostat, the inner end of said key coacting with said switch to close the switch circuit when said key is pushed into position, whereby the radio set may be tuned for wave length and adjusted for volume by rotation of said knob and key respectively and said radio turned on or off by insertion and removal of said key in a radial direction.

7. A device, as claimed in claim 6, wherein said switch comprises a pair of substantially parallel switch blades insulated from each other, which blades are electrically connected together by said key when inserted into operating position.

8. A device, as claimed in claim 6, wherein an operating member is attached to said rheostat arm, which member extends radially through a segmental slot in said housing.

9. A device, as claimed in claim 6, wherein a key receiving sleeve is attached to said rheostat arm which sleeve extends outwardly through a segmental slot in said housing so that the rheostat may be operated from the exterior of the housing by oscillating said key and sleeve.

EDWARD S. HUFF.